Patented May 23, 1933

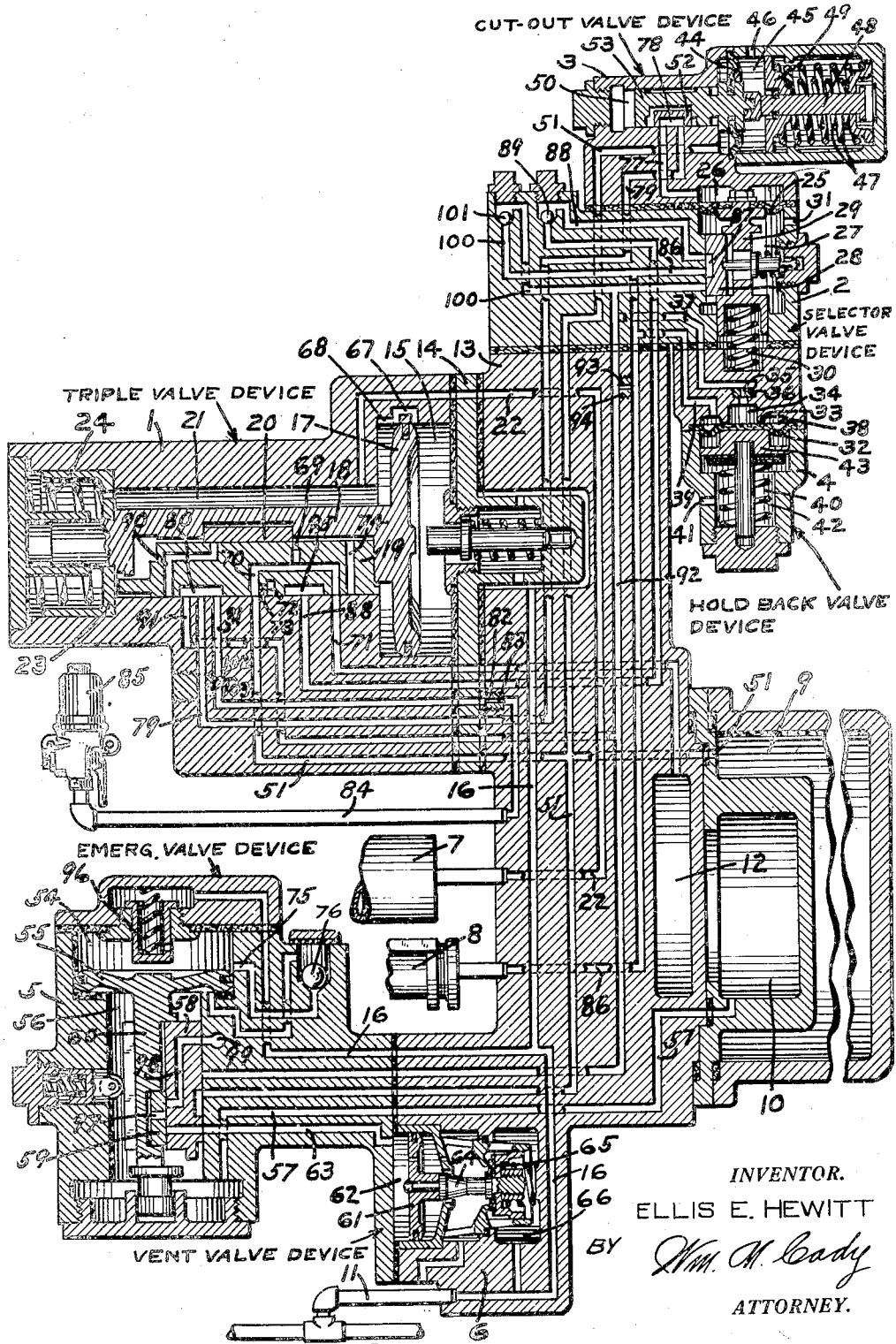

1,910,544

UNITED STATES PATENT OFFICE

ELLIS E. HEWITT, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed August 19, 1931. Serial No. 558,036.

This invention relates to fluid pressure brakes of the type in which the brakes are applied by effecting a reduction in brake pipe pressure and are released by effecting an increase in brake pipe pressure.

With the present tendency to increase the number of cars in a train, the difficulty of controlling the brakes so as not to produce excessive shocks is correspondingly increased.

Such shocks are liable to be produced because the brakes on the cars at the head end of the train are applied before the brakes on the rear cars are applied, so that the slack in the train tends to run in and thus cause shocks, which increase in severity as the length of the train is increased.

The principal object of my invention is to provide a fluid pressure brake equipment which will so regulate the supply of fluid under pressure to the brake cylinder that severe shocks will be prevented. For this purpose the brake equipment is adapted upon effecting an application of the brakes to first supply fluid under pressure to the brake cylinder from a relatively small inshot reservoir in order to insure the movement of the brake cylinder piston out past the usual leakage groove and so as to cause the brake shoes to engage the wheels and to then gradually build up the brake cylinder pressure by flow through a restricted port, until the brake cylinder pressure has been increased to a predetermined degree, and then permitting the brake cylinder pressure to be increased at a more rapid rate.

Other objects and advantages will appear in the following more detailed description of the invention.

In the accompanying drawing, the single figure is a diagrammatic sectional view of a fluid pressure brake equipment embodying my invention.

According to my invention, the equipment may comprise a triple valve device 1, a selector valve device 2, a cut-out valve device 3, a hold back valve device 4, an emergency valve device 5, a vent valve device 6, an auxiliary reservoir 7, a brake cylinder 8, an emergency reservoir 9, a quick action reservoir 10, a brake pipe 11, and an inshot reservoir 12.

The triple valve device 1 comprises a casing secured to a pipe bracket 13, a filling piece 14 being interposed between the casing and the pipe bracket. On the casing is provided a piston chamber 15 connected by a passage 16 to the brake pipe 11 and containing a piston 17. The piston 17 is provided with a stem 18 for operating a main slide valve 19 and a graduating valve 20, contained in valve chamber 21, said chamber being connected to the auxiliary reservoir 7 through a passage 22. The triple valve device may be of the retarded release type having a movable member 23, subject to the pressure of a spring 24, for opposing movement of the piston 17 from full release position to the inner retarded release position.

The selector valve device 2 may comprise a casing secured to the pipe bracket 13 and containing a flexible diaphragm 25 having a chamber 26 at one side and a valve chamber 27 at the opposite side open to the atmosphere through a port 31 and containing a slide valve 28 adapted to be operated by said diaphragm through a stem 29. The movement of the diaphragm 25 in one direction is opposed by a spring 30.

The hold back valve device 4 comprises a casing secured to the selector valve casing and containing a flexible diaphragm 32, movable to engage an annular seat rib 33. The chamber 34 formed by the seating of the diaphragm is connected through a restricted port 35 in a choke plug 36 with a passage 37, and chamber 38 surrounding the seat rib 33 is connected to a passage 39. The chamber 40 at the opposite side of the diaphragm 32 is open to the atmosphere through a port 41 and contains a coil spring 42 which acts on the diaphragm 32 through a follower plate 43.

The cutout valve device 3 comprises a casing secured to the casing of the valve device 2 and containing a flexible diaphragm 44 having a chamber 45 at one side open to the atmosphere through a port 46 and in which are mounted coil springs 47 adapted to act on the diaphragm 44, through a stem 48 and a spring plate 49.

The valve chamber 50 at the opposite side of the diaphragm 44 is connected to the emergency reservoir 9 through a passage 51 and contains a slide valve 52 adapted to be operated by diaphragm 44, through a stem 53.

The emergency valve device 5 comprises a casing secured to the pipe bracket 13, and having a piston chamber 54, connected to brake pipe passage 16 and containing a piston 55. The valve chamber 56 at the opposite side of piston 55 is connected through a passage 57 with the quick action reservoir 10 and contains a main slide valve 58 and an auxiliary valve 59 adapted to be operated by piston 55, through a stem 60.

The vent valve device 6 is disposed in the pipe bracket 13 and comprises a piston 61 having the chamber 62 at one side connected to a passage 63 leading to the seat of slide valve 58. The piston 61 is provided with a stem 64 for operating a vent valve 65, contained in valve chamber 66, which chamber is connected to brake pipe passage 16.

In operation, when the brake pipe 11 is charged with fluid under pressure in the usual manner, fluid flows from the brake pipe through passage 16 to the piston chamber 15 of the triple valve device 1 and if the piston 17 is in full release position, as shown in the drawing, fluid flows through the feed passage 67 to valve chamber 21. If the piston 17 is in the inner retarded release position, fluid flows from piston chamber 15 through the feed passage 68 to the valve chamber 21.

From valve chamber 21, fluid flows through passage 22, charging the auxiliary reservoir 7 with fluid under pressure and also through a restricted port 69 and a cavity 70 in the main slide valve 19 to passage 51, so that the emergency reservoir 9 is charged with fluid under pressure. The cavity 70, with the main slide valve 19 in full release position, also registers with a passage 71 leading to the inshot reservoir 12, so that said reservoir is charged with fluid under pressure.

With the piston 17 in retarded release position, the passage 51 registers with a port 72 in the main slide valve 19, which is connected to cavity 70, through a restricted port 73. In the retarded release position, a port 74 in the main slide valve 19, registers with passage 71, so that the emergency reservoir 9 and the inshot reservoir 12 are charged with fluid under pressure in either the full or retarded release position of the triple valve device.

The piston chamber 54 of the emergency valve device 5 is charged with fluid under pressure from the brake pipe through passage 16 and fluid flows from piston chamber 54, through a passage 75 containing a check valve 76 to the valve chamber 56. The quick action reservoir 10 is charged with fluid under pressure from the valve chamber 56 through passage 57.

The cut-out valve device 3 is employed to cut out the retarded brake application feature when the train is operating in high speed service, as will be hereinafter more fully explained, but assuming the train is operating in low speed service, the pressure in the emergency reservoir will correspond with the lower brake pipe pressure then carried in the brake pipe, such as seventy pounds. The springs 47 are such that seventy pounds pressure in the valve chamber 50 acting on diaphragm 44, will not be sufficient to overcome the resistance of the springs, so that in low speed service, the diaphragm 44 maintains the slide valve 52 in the position shown in the drawing, in which passage 77, leading to chamber 26 of the selector valve device 2 is connected through cavity 78 with passage 79, which leads to the seat of main slide valve 19.

With the triple valve device 1 in release position, as shown in the drawing, the diaphragm chamber 26 of the selector valve device 2 is vented to the atmosphere, through passage 77, cavity 78 in valve 52, passage 79, cavity 80 in main slide valve 19, passage 81, containing a choke plug 82 having a restricted port 83, and pipe 84, leading to a pressure retaining valve device 85, it being assumed that the pressure retaining valve device is in its free release position.

With chamber 26 at atmospheric pressure, the spring 30 maintains the diaphragm 25 and slide valve 28 in the position shown in the drawing, in which passage 86 leading to the brake cylinder 8 is connected, through a cavity 87 in slide valve 28, with passage 88, which leads to the seat of slide valve 19 and contains a non-return check valve 89.

When the brake pipe pressure is gradually reduced to effect a service application of the brakes, the triple valve piston 17 is moved out, first actuating the graduating valve 20 so as to uncover the service port 90 in the main slide valve 19, and then moving the main slide valve until the port 90 registers with passage 91. In this position, fluid under pressure is then supplied from valve chamber 21 and the auxiliary reservoir 7 to passage 91. Passage 91 connects with passage 92 and passage 92 is connected to brake cylinder passage 26 through a restricted port 93 in choke plug 94, so that fluid is supplied from the auxiliary reservoir to the brake cylinder at a restricted rate.

In service position, a cavity 95 in slide valve 19 connects passage 71 with passage 88, so that fluid under pressure is supplied to the brake cylinder from the initial inshot reservoir 12 through passage 71, cavity 95, passage 88, past check valve 89, cavity 87 in valve 28, and passage 86.

Fluid under pressure supplied from the inshot reservoir 12 to the brake cylinder is sufficient to insure that the brake cylinder piston will be moved out past the usual leakage groove in the brake cylinder and so that the brake shoes will engage the wheels.

The pressure in the brake cylinder is then built up slowly by flow from the auxiliary reservoir through the restricted port 93, so that the brakes on the cars at the head end of the train will not be applied with such force as to permit the slack of the train to run in with sufficient force to cause excessive shocks, before the brakes are applied on cars at the rear of the train.

The pressure of fluid supplied to the brake cylinder acts in chamber 38 on the diaphragm 32 of the hold back valve device 4, as supplied from passage 86 to passage 39, and when the pressure of fluid so supplied has been increased to a predetermined degree, which will occur after the slack has run in, the pressure of spring 42, will be overcome, and the diaphragm 32 will be flexed downwardly, so that it will be moved from the seat rib 33, permitting direct flow of fluid from auxiliary reservoir supply passage 92, through passage 37 and the restricted passage 35 to passage 39 and the brake cylinder. The brake cylinder pressure is then built up to the desired pressure at the normal rate.

It will thus be seen that in applying the brakes, fluid under pressure is initially supplied from the inshot reservoir 12 to the brake cylinder at a relatively rapid rate to insure movement of the brake cylinder piston so as to cause the brake shoes to engage the wheel and then the brake cylinder pressure is further built up at a slow rate, such as to permit the slack from running in so as to cause excessive shocks, and finally the pressure in the brake cylinder is permitted to build up at the faster normal rate.

When a gradual reduction in brake pipe pressure is effected, the emergency piston 55 is moved out until it engages the spring stop 96. In this movement, the auxiliary valve 59 is moved so that port 97 registers with port 98 in slide valve 58. The port 98 registers with exhaust port 99 in normal release position of slide valve 58, so that fluid under pressure is vented from valve chamber 56 and the quick action reservoir 10, until the pressure in valve chamber 56 has been reduced to a degree slightly less than the reduced brake pipe pressure, when the piston 55 will be shifted so as to move the auxiliary valve 59 to lap the port 98, thus preventing the movement of the emergency valve device to emergency position, when a gradual reduction in brake pipe pressure is effected.

If it is desired to release the brakes, the brake pipe pressure is increased in the usual manner, causing the triple pistons on cars at the head end of the train to be shifted to the inner retarded release position, and on cars at the rear end of the train to the full release position.

On releasing, fluid under pressure can flow from the brake cylinder through passage 100 and past the check valve 101 to passage 92 as well as by way of the restricted port 93, and if the slide valve 19 is in full release position, fluid flows from passage 91, through cavity 80 to exhaust passage 81. In the retarded release position of slide valve 19, the passage 81 is blanked, and fluid is vented from the brake cylinder at a restricted rate by flow through passage 79 and restricted port 102 in choke plug 103.

If the train is operating in high speed service, where it is not necessary to restrict the rate of build up of brake cylinder pressure in order to avoid shocks, the fact that a higher brake pipe pressure is employed in high speed service, such as ninety pounds, is utilized to control the cutting out of the delayed application feature.

When a high brake pipe pressure is carried in the system in high speed service, this pressure is sufficient to overcome the resistance of the springs 47 acting on the diaphragm 44 of the cut-out valve device so that the emergency reservoir pressure (which is at the pressure carried in the brake pipe) acting in valve chamber 50, operates to flex the diaphragm 44, so that the valve 52 is shifted to a position, in which the valve chamber 50 and the emergency reservoir 9 are connected to passage 77 and thus to diaphragm chamber 25. The diaphragm 25 is then flexed downwardly by emergency reservoir pressure, moving the slide valve 28, so that cavity 87 connects passage 100 with passage 86. The passage 88 is now blanked, so that in applying the brakes, fluid under pressure is not supplied from the initial inshot reservoir 12 to the brake cylinder.

With passage 100 connected to passage 86, when the brakes are applied fluid under pressure is supplied from the auxiliary reservoir by way of passage 92, passage 100 and cavity 87 direct to brake cylinder passage 86, instead of only through the restricted passage 93, so that the brake cylinder pressure is now built up at the usual rate.

In cycling on grades, in which the pressure retainers are cut in, so as to retain a certain amount of pressure in the brake cylinder when the brake pipe pressure is increased to effect the movement of the triple valve device to release position, so that the auxiliary reservoir on each car may be recharged without releasing the brakes, it is not necessary to hold back the brake application on the cars, and consequently the apparatus is arranged to cut out the restricted brake cylinder pressure build up feature in cycling.

For this purpose, the diaphragm chamber 26 of the selector valve device 2 is supplied with fluid under pressure at the pressure retained in the brake cylinder, which pressure is sufficient to flex the diaphragm 25 against the pressure of the spring 30, so that the valve 28 is moved to its cut out position.

In the release position of the triple valve device, passage 79 is connected, through cavity 80 in slide valve 19, with passage 81, so that if the retaining valve device 85 is turned to its pressure retaining position, fluid at the pressure retained in the brake cylinder will be supplied to the diaphragm chamber 26 through passage 79, cavity 78 in valve 53, and passage 77.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake for a train, the combination with a brake cylinder and a brake controlling valve device for normally controlling the supply of fluid under pressure through a restricted communication to the brake cylinder, of a selector valve device comprising a valve having a position in which communication is established for permitting a more rapid flow of fluid to the brake cylinder, a spring and a movable abutment subject to the opposing pressures of said spring and a chamber for moving said valve to said position and operated upon a predetermined increase in pressure in said chamber, said controlling valve device being adapted in release position to connect said chamber with the brake cylinder.

2. In a fluid pressure brake, the combination with a brake pipe, a brake cylinder, and a triple valve device for controlling the admission and release of fluid under pressure to and from the brake cylinder, and having a full release position and a restricted release position, of a selector valve device for varying the rate at which said triple valve device supplies fluid to the brake cylinder and comprising a valve and a movable abutment operated by variations in fluid pressure for actuating said valve, said abutment being subjected to the pressure of fluid released from the brake cylinder in both release positions of the triple valve device.

3. In a fluid pressure brake, the combination with a brake pipe, a brake cylinder, and a triple valve device for controlling the admission and release of fluid under pressure to and from the brake cylinder, and having a full release position and a restricted release position, of a selector valve device for varying the rate at which said triple valve device supplies fluid to the brake cylinder and comprising a valve, a spring and a movable abutment subject to the opposing pressure of said spring and a chamber for operating said valve, said chamber being subject to the pressure of fluid released from the brake cylinder in both release positions of the triple valve device.

4. In a fluid pressure brake, the combination with a brake pipe, a brake cylinder and a triple valve device for controlling the admission and release of fluid under pressure to and from the brake cylinder, and having a full release position and a restricted release position, of a selector valve device for varying the rate at which said triple valve device supplies fluid to the brake cylinder and comprising a valve, a spring and a movable abutment subject to the opposing pressure of said spring and a chamber for operating said valve upon a predetermined increase in pressure in said chamber, said triple valve device connecting the brake cylinder to said chamber in both release positions of the triple valve device.

5. In a fluid pressure brake, the combination with a brake pipe, a brake cylinder, and a triple valve device for controlling the admission and release of fluid under pressure to and from the brake cylinder and operated upon a gradual reduction in brake pipe pressure to supply fluid to the brake cylinder, of a retaining valve device for retaining fluid pressure in the brake cylinder and a selector valve device for varying the rate at which said triple valve device supplies fluid under pressure to the brake cylinder in effecting a service application of the brakes, and comprising a valve, a spring, and a movable abutment subject to the opposing pressures of said spring and a chamber supplied with fluid at the pressure retained in the brake cylinder for operating said valve.

In testimony whereof I have hereunto set my hand, this 14th day of August, 1931.

ELLIS E. HEWITT.